United States Patent
Huang

(10) Patent No.: US 9,386,615 B2
(45) Date of Patent: Jul. 5, 2016

(54) ADAPTIVE PAGING PROCEDURE FOR A CALL TERMINATING VIA A WIRELESS LOCAL AREA NETWORK

(71) Applicant: Verizon Patent and Licensing Inc., Arlington, VA (US)

(72) Inventor: Chien-Yuan Huang, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 14/305,339

(22) Filed: Jun. 16, 2014

(65) Prior Publication Data

US 2015/0365989 A1    Dec. 17, 2015

(51) Int. Cl.
*H04W 72/02* (2009.01)
*H04W 64/00* (2009.01)
*H04W 76/02* (2009.01)
*H04W 12/08* (2009.01)
*H04W 84/12* (2009.01)

(52) U.S. Cl.
CPC ............ *H04W 76/022* (2013.01); *H04W 12/08* (2013.01); *H04W 64/003* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2007/0189218 A1* | 8/2007 | Oba | ....................... | H04W 36/12 370/331 |
| 2009/0170475 A1* | 7/2009 | Ch'ng | .................... | H04W 12/02 455/411 |
| 2011/0261787 A1* | 10/2011 | Bachmann | ............ | H04L 63/029 370/331 |
| 2012/0093031 A1* | 4/2012 | Wang | ....................... | H04L 29/06 370/254 |
| 2015/0195771 A1* | 7/2015 | Hurtta | .................... | H04W 48/08 370/338 |

* cited by examiner

*Primary Examiner* — Eunsook Choi

(57) ABSTRACT

A system may receive call setup information associated with a call to be received by a terminating device via a particular untrusted wireless local area network (WLAN). The system may determine location information, associated with the terminating device, based on receiving the call setup information. The location information may include information that identifies the particular untrusted WLAN to which the terminating device is connected. The system may provide the call setup information to the terminating device via the particular untrusted WLAN. The call setup information may be provided to the terminating device based on the location information associated with the terminating device and may be provided to cause a tunnel to be created. The tunnel, when created, may allow the terminating device to receive the call via the particular untrusted WLAN. The system may cause the call to be received by the terminating device via the tunnel and the particular untrusted WLAN.

20 Claims, 9 Drawing Sheets

ADAPTIVE PAGING PROCEDURE FOR A CALL TERMINATING VIA A WIRELESS LOCAL AREA NETWORK

BACKGROUND

A service provider may provide a service that allows a terminating device to receive a call from an originating device via a wireless local area network (e.g., a WLAN, such as a WiFi network) to which the terminating device is connected. For example, the service provider may provide a voice over WLAN service, a video over WLAN service, or another similar type of service.

DETAILED DESCRIPTION OF PREFERRED EMBODIMENTS

The following detailed description of example implementations refers to the accompanying drawings. The same reference numbers in different drawings may identify the same or similar elements.

A terminating device may be capable of receiving a call (e.g., a voice call, a video call, etc.), provided via a service provider network and an untrusted WLAN (e.g., a WLAN that is not controlled, managed, maintained, etc. by the service provider) associated with the terminating device. However, in order to allow the terminating device to receive the call, a device included in the service provider network (e.g., such an evolved packet data gateway (ePDG)), may be required to maintain a tunnel (e.g., an internet protocol security (IPsec) tunnel) that allows the terminating device to receive the call via the untrusted WLAN, even when the terminating device is idle (e.g., when the terminating device is not on a call). In some implementations, the terminating device may communicate with the ePDG via an SWu logical interface, as defined by the $3^{rd}$ Generation Partnership Project (3GPP). Maintaining these idle tunnels may result in inefficient use of resources by the service provider network.

One potential manner in which to manage this problem is by implementing an LTE paging procedure. For example, when the terminating device is connected to an LTE network, the terminating device may be notified (e.g., via the LTE network) that the terminating device is to create the tunnel in order to receive a call via the untrusted WLAN, and the terminating device may create the tunnel accordingly. As such, the tunnel need not be consistently maintained while the terminating device may be reached via the LTE network. However, in some cases, the terminating device may be unable to receive information via the LTE network (e.g., when the terminating device is not able to connect to the LTE network, when the terminating device is in a WiFi only environment, when the terminating device is out of an LTE coverage area, etc.).

Implementations described herein may allow a tunnel, associated with allowing a terminating device to receive a call via an untrusted WLAN, to be created in an on-demand manner by communicating with the terminating device via the untrusted WLAN (e.g., rather than via an LTE network).

Figure 1A:
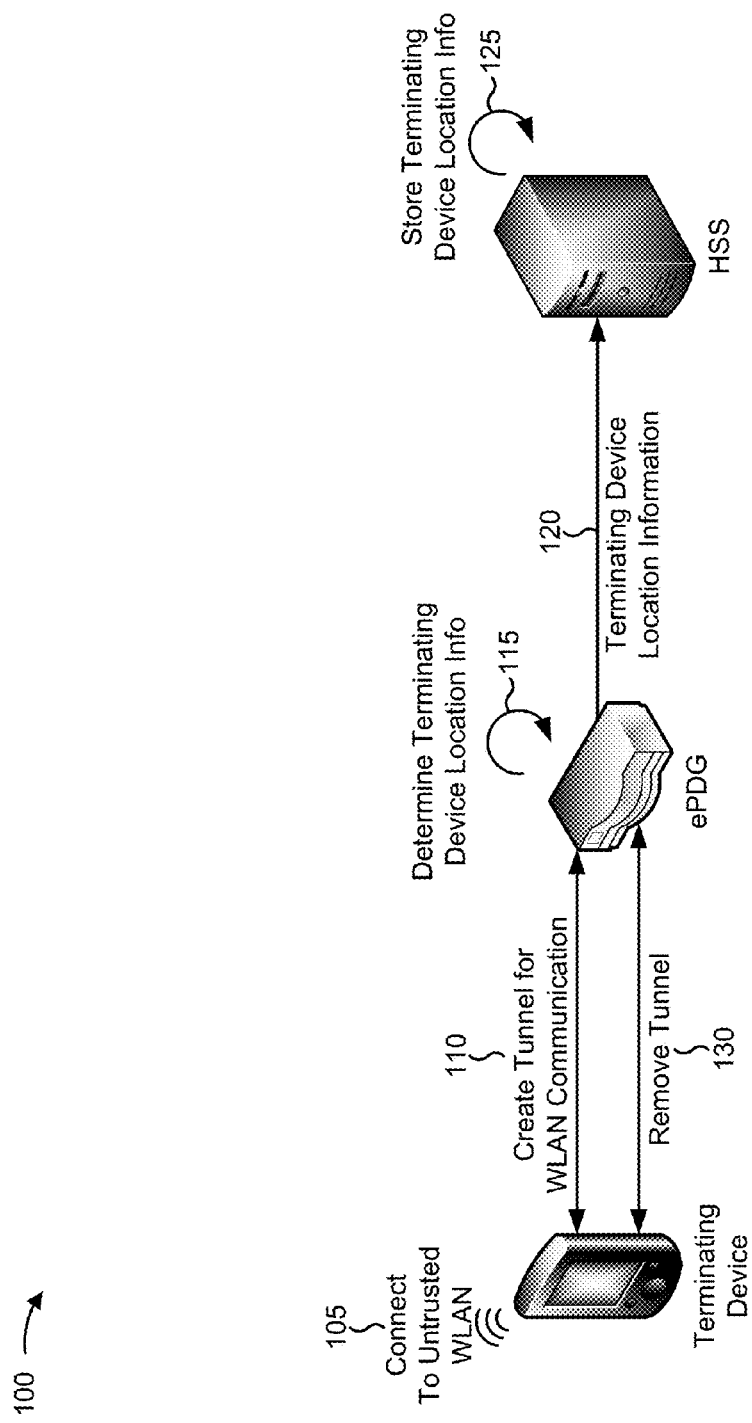
FIGS. 1A and 1B are diagrams of an overview of an example implementation described herein.
Figure 1B:
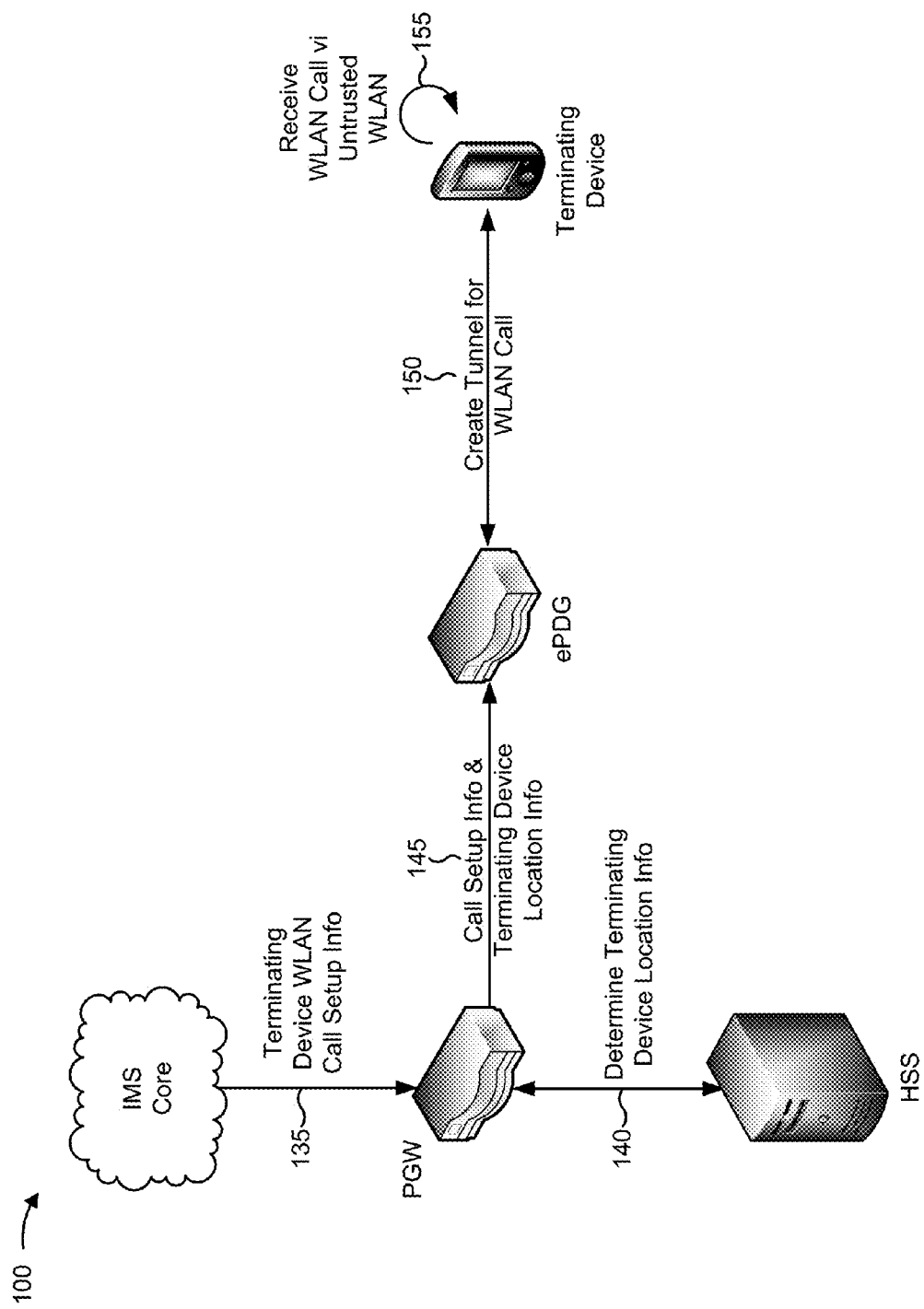

FIGS. 1A and 1B are diagrams of an overview of an example implementation 100 described herein. For the purposes of example implementation 100, assume that a terminating device is capable of receiving, a call (e.g., a voice call, a video call, etc.) via an untrusted WLAN associated with the terminating device and a service provider network. Further, assume that the terminating device is not connected to the untrusted WLAN, but that the terminating device has entered a geographical area in which the terminating device may connect to the untrusted WLAN (e.g., via a home access point (AP) device associated with the untrusted WLAN and not owned, controlled, managed, etc. by the service provider). Finally, assume that the terminating device is unable to connect to an LTE network associated with the service provider (e.g., assume that the terminating device is outside a coverage area of the LTE network).

As shown in FIG. 1A, and by reference number 105, the terminating device may connect to the untrusted WLAN (e.g., via the AP device). As shown by reference number 110, upon connecting to the untrusted WLAN, the terminating device may communicate (e.g., via the untrusted WLAN) with an ePDG, associated with the service provider network, to create a tunnel that may allow the terminating device to receive a call via the untrusted WLAN and the service provider network.

As shown by reference number 115, the ePDG may determine (e.g., based on information received from the terminating device during and/or after the creation of the tunnel), location information associated with the terminating device (e.g., a device identifier that identifies the terminating device, an identifier associated with the AP device, an identifier associated with the untrusted WLAN, etc.). As shown by reference 120, the ePDG may provide the location information to a home subscriber server (HSS) associated with the service provider network. As shown by reference number 125, the HSS may store the location information associated with the terminating device. As shown by reference number 130, based on providing the location information to the HSS, the ePDG and/or the terminating device may remove the tunnel (e.g., such that the ePDG no longer maintains the tunnel).

For the purposes of FIG. 1B, assume that an originating device (not pictured) has placed a call, via the service provider network, that is to be received by the terminating device via the untrusted WLAN. Further, assume that terminating device is still connected to the untrusted WLAN, as described above. As shown by reference number 135, an internet protocol multimedia subsystem (IMS) core, associated with the service provider network, may receive call setup information associated with the call that is to be received by the terminating device via the untrusted WLAN, and may provide the call setup information to a packet data network gateway (PGW) associated with the service provider network. As shown by reference number 140, the PGW may receive the call setup information and may communicate with the HSS to determine the location information associated with the terminating device. As shown by reference number 145, the PGW may provide, to the ePDG, the call setup information and the terminating device location information. As shown by reference number 150, the ePDG may receive the call setup information and the terminating device location information, and may cause (e.g., by providing the call setup information to the terminating device based on the location information) the terminating device to create a tunnel that allows the terminating device to receive the call via the untrusted WLAN. As shown by reference number 155, the terminating device may, upon creation of the tunnel, receive the call via the untrusted WLAN (e.g., such that the call between the originating device and the terminating device is connected).

In this way, a tunnel, associated with allowing a terminating device to receive a call via an untrusted WLAN, may be created in an on-demand manner by communicating with the terminating device via the untrusted WLAN. This may allow a service provider network, associated with the call, to efficiently use service provider network resources without the need to maintain an idle tunnel associated with receiving the call via the untrusted WLAN. This may also be beneficial in situations where the terminating device does not have a connection to the LTE network.

Figure 2:
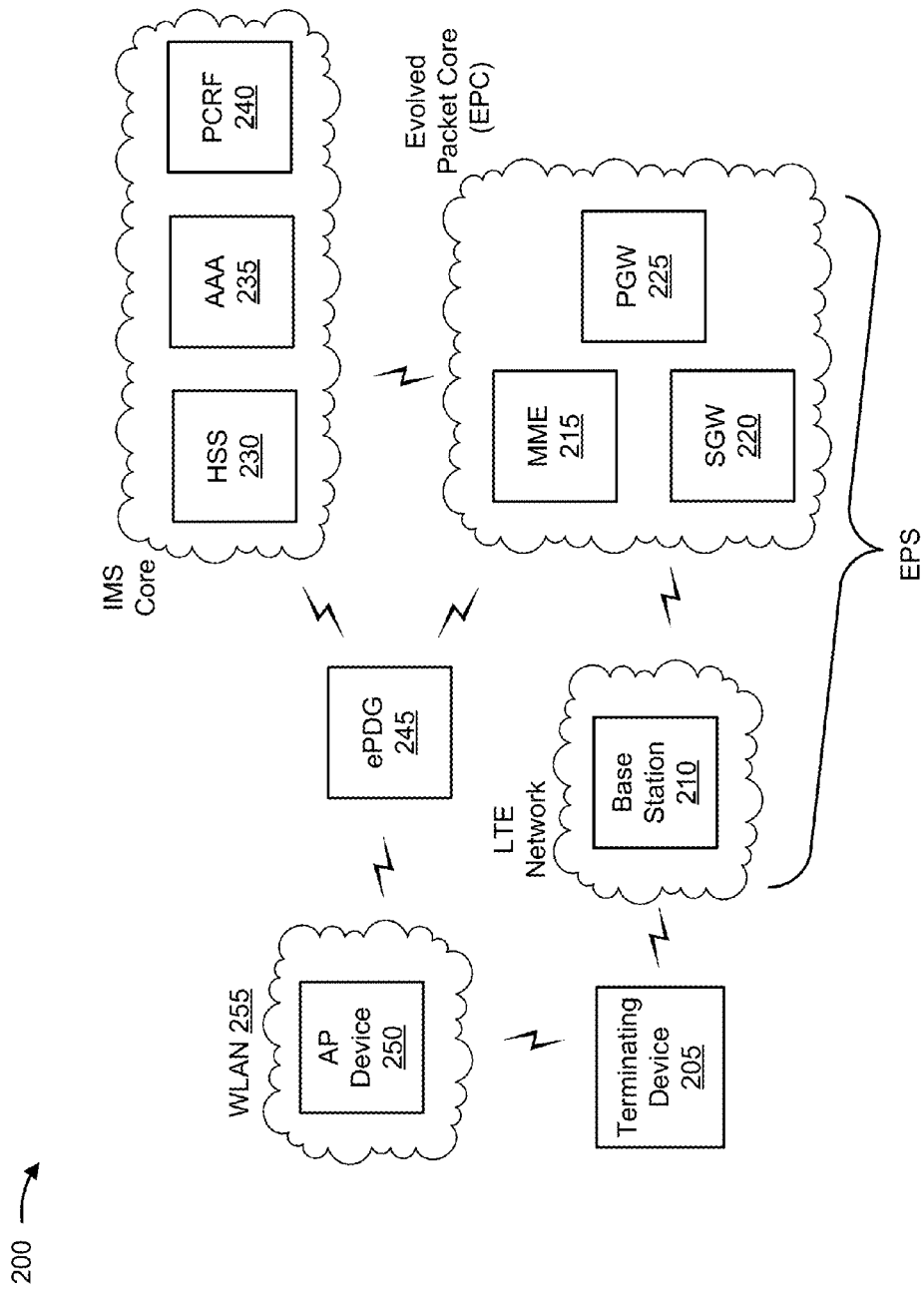
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a terminating device 205, a base station 210, a mobility management entity (MME) 215, a serving gateway (SGW) 220, a PGW 225, an HSS 230, an authentication, authorization, and accounting server (AAA) 235, a policy and charging rules function server (PCRF) 240, an ePDG 245, an AP device 250, and a WLAN 255. Devices of environment 200 may interconnect via wired connections, wireless connections, or a combination of wired and wireless connections.

Some implementations are described herein as being performed within an LTE network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which terminating devices 205 communicate with the EPC. The EPC may include MME 215, SGW 220, PGW 225, and/or ePDG 245 that enable terminating devices 205 to communicate with an IMS core. The IMS core may include HSS 230, AAA 235, and/or PCRF 240 and may manage device registration and authentication, session initiation, etc., associated with terminating devices 205. HSS 230, AAA 235, and/or PCRF 240 may reside in the EPC and/or the IMS core.

Terminating device 205 may include one or more devices capable of communicating with base station 210 and/or WLAN 255 (e.g., via AP device 250). For example, terminating device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. Terminating device 205 may be capable of sending information to and/or receive information from the LTE network, WLAN 255, and/or the IMS core. In some implementations, terminating device 205 may be capable of creating and/or removing a tunnel between ePDG 245 and terminating device 205 associated with a call to be received by terminating device 205.

Base station 210 may include one or more devices capable of transferring traffic, such as audio, video, text, and/or other traffic, destined for and/or received from terminating device 205. In some implementations, base station 210 may include an eNB associated with the LTE network that receives traffic from and/or sends traffic via SGW 220 and/or PGW 225. Additionally, or alternatively, one or more base stations 210 may be associated with a RAN that is not associated with the LTE network. Base station 210 may send traffic to and/or receive traffic from terminating device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with terminating device 205. In some implementations, MME 215 may perform operations relating to authentication of terminating device 205. Additionally, or alternatively, MME 215 may facilitate the selection of a particular SGW 220 and/or a particular PGW 225 to serve traffic to and/or from terminating device 205. MME 215 may perform operations associated with handing off terminating device 205 from a first base station 210 to a second base station 210 when terminating device 205 is transitioning from a first cell associated with the first base station 210 to a second cell associated with the second base station 210. Additionally, or alternatively, MME 215 may select another MME (not pictured), to which terminating device 205 should be handed off (e.g., when terminating device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic via PGW 225 and/or other network devices associated with the EPC and/or the IMS core. SGW 220 may also receive traffic from other network devices, and may send the received traffic to terminating device 205 via base station 210. Additionally, or alternatively, SGW 220 may perform operations associated with handing off terminating device 205 to and/or from an LTE network.

PGW 225 may include one or more devices capable of providing connectivity for terminating device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to another network. Additionally, or alternatively, PGW 225 may receive traffic from the other network, and may send the traffic to terminating device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with terminating device 205. For example, HSS 230 may manage subscription information associated with terminating device 205, such as information that identifies a subscriber profile of a user associated with terminating device 205, information that identifies services and/or applications that are accessible to terminating device 205, location information associated with terminating device 205, a network identifier (e.g., a network address) that identifies terminating device 205, information that identifies a treatment of terminating device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with terminating device 205. For example, AAA 235 may perform authentication operations for terminating device 205 and/or a user of terminating device 205 (e.g., using one or more credentials), may control access, by terminating device 205, to a service and/or an application (e.g., based on one or more restrictions, such as time-of-day restrictions, location restrictions, single or multiple access restrictions, read/write restrictions, etc.), may track resources consumed by terminating device 205 (e.g., a quantity of voice minutes consumed, a quantity of data consumed, etc.), and/or may perform similar operations.

PCRF 240 may include a device, such as a server, capable of determining and/or enforcing policy rules in the EPC, the IMS core, and/or the LTE network. In some implementations, PCRF 240 may establish quality of service and charging (e.g., packet accounting) rules for a communication session based on committed quality of service levels per user, per terminating device, per service type, per application, etc. PCRF server 240 may receive input (e.g., from the IMS core) regarding users, terminating devices 205, subscriptions, and/or applications. PCRF 240 may create quality of service and charging policy rules for the session (e.g., for a user, terminating device 205, an application, etc.), and may provide the policy rules to PGW 225, which may handle packets for the communication session with a particular terminating device 205 (e.g., running a particular application) based on the policy rules.

ePDG 245 may include a device capable of securing information received from and/or transmitted to terminating device 205 connected to the EPC over an un-trusted access, such as WLAN 255. In some implementations, ePDG 245 may act as a termination node of a tunnel (e.g., an IPsec tunnel) between ePDG 245 and terminating device 205. In some implementations, ePDG 245 may be capable of creating, maintaining, and/or removing a tunnel between ePDG 245 and terminating device 205 associated with a call to be received by terminating device 205. Additionally, or alternatively, ePDG 245 may be capable of communicating with one or more other devices (e.g., PGW 225, HSS 230, etc.) in order to place a call to be received by terminating device 205 via WLAN 255. In some implementations, ePDG 245 may communicate with HSS 230 via an SWm logical interface, as defined by the 3GPP.

AP device 250 may include a device capable of allowing terminating device 205 to communicate with one or more devices, included in the service provider network, via WLAN 255. For example, AP device 250 may include a router, a gateway, a modem, a switch, and/or another type of device that allows terminating device 205 to communicate with one or more devices of the service provider network via WLAN 255. In some implementations, AP device 250 may be included in WLAN 255. In some implementations, AP device 250 may not be provided, owned, controlled, managed, etc. by the service provider.

WLAN 255 may include one or more wireless local area networks (e.g., a WiFi network), a data network, a wireless ad hoc network, or another similar type of network. In some implementations, WLAN 255 may be an untrusted WLAN (e.g., a WLAN that is not owned, controlled, managed, maintained, etc. by the service provider). In some implementations, WLAN 255 may allow terminating device 205 to communicate with another device (e.g., ePDG 245) in order to receive a call provided via a service provider network. In some implementations, WLAN 255 may include one or more network devices, such as AP device 250, that permit communication between WLAN 255 and other devices and/or networks included in the service provider network (e.g., ePDG 245, the IMS core, the EPC, etc.).

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
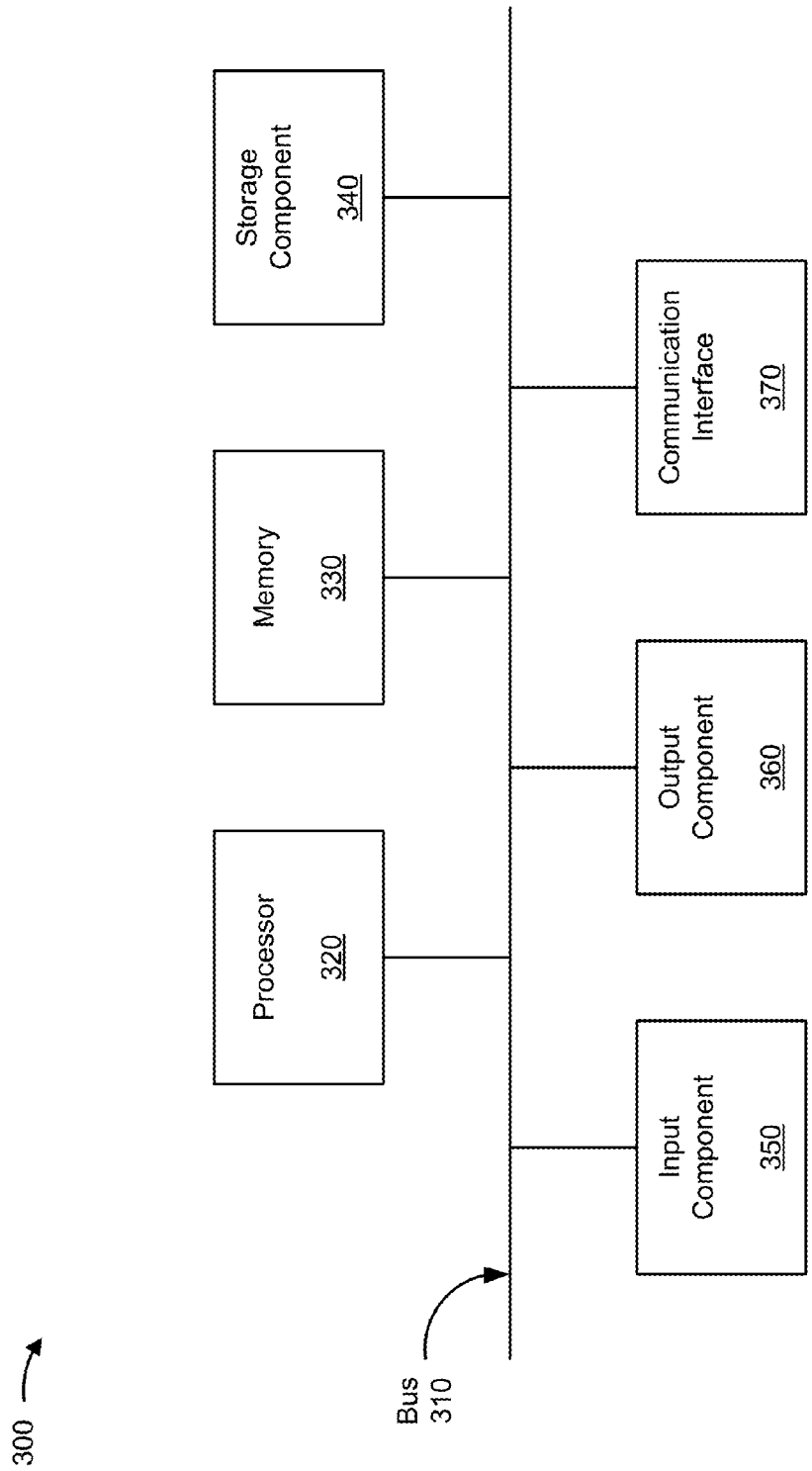
FIG. 3 is a diagram of example components of one or more devices of FIG. 2.

FIG. 3 is a diagram of example components of a device 300. Device 300 may correspond to terminating device 205, base station 210, MME 215, SGW 220, PGW 225, HSS 230, AAA 235, PCRF 240, ePDG 245, and/or AP device 250. In some implementations, terminating device 205, base station 210, MME 215, SGW 220, PGW 225, HSS 230, AAA 235, PCRF 240, ePDG 245, and/or AP device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
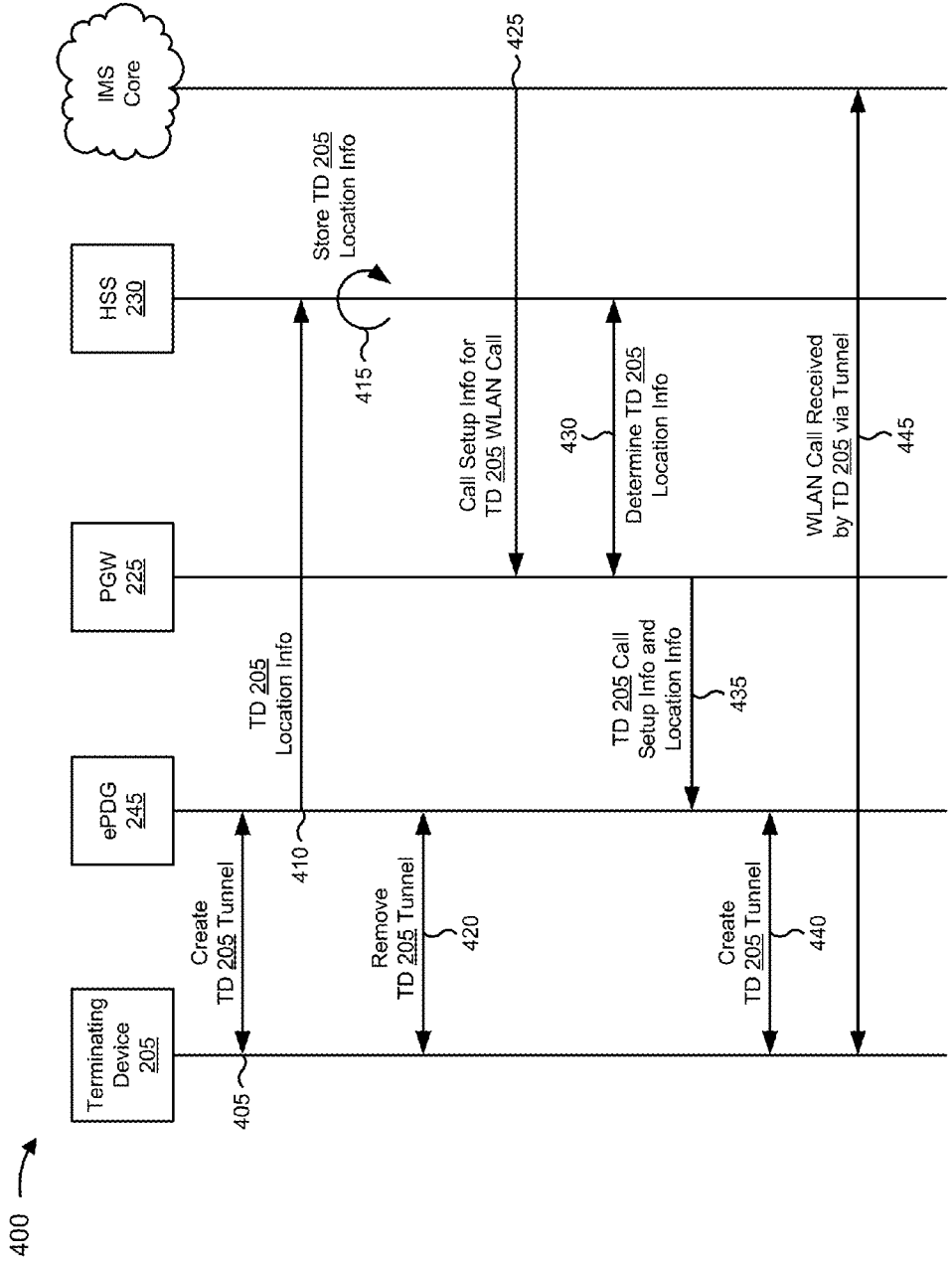
FIG. 4 is a call flow diagram of an example process for causing a tunnel, associated with a call to be received by a terminating device via a WLAN, to be created by communicating with the terminating device via the WLAN.

FIG. 4 is a call flow diagram of an example process 400 for causing a tunnel, associated with a call to be received by a terminating device via a WLAN, to be created by communicating with the terminating device via the WLAN. In some implementations, one or more operations of FIG. 4 may be performed by one or more devices included in environment 200.

As shown in FIG. 4, process 400 may include causing a tunnel, associated with a terminating device and an untrusted WLAN, to be created (shown at reference number 405). For example, terminating device 205 may cause a tunnel, associated with terminating device 205 and WLAN 255, to be created. In some implementations, terminating device 205 may cause the tunnel to be created when terminating device 205 connects to WLAN 255, as discussed below. Additionally, or alternatively, terminating device 205 may cause the tunnel to be created when terminating device 205 receives information, indicating that terminating device 205 is to cause the tunnel to be created, from another device, such as ePDG 245. Additionally, or alternatively, terminating device 205 may cause the tunnel to be created based on user input indicating that terminating device 205 is to cause the tunnel to be created.

A tunnel may include a connection between terminating device 205 and ePDG 245, via WLAN 255, that allows terminating device 205 to receive a call via WLAN 255. In some implementations, terminating device 205 may cause the tunnel to be created based on connecting to WLAN 255. For example, terminating device 205 may connect (e.g., automatically, based on user input, etc.) to WLAN 255 (e.g., via AP device 250), when terminating device 205 enters a geographic area associated with WLAN 255. In this example, terminating device 205 may be configured to cause a tunnel, between terminating device 205 and ePDG 245, to be created when terminating device 205 connects to WLAN 255, and terminating device 205 may cause the tunnel to be created, accordingly. Additionally, or alternatively, terminating device 205 may cause the tunnel to be created based on user input (e.g., when a user of terminating device 205 indicates that terminating device 205 is to cause the tunnel to be created).

In some implementations, terminating device 205 may cause an IPsec tunnel to be created between terminating device 205 and ePDG 245 (e.g., a tunnel that implements a a protocol suite for securing Internet Protocol (IP) communications by authenticating and encrypting each IP packet of a communication session). Additionally, or alternatively, terminating device 205 may cause another type of tunnel to be created between terminating device 205 and ePDG 245.

In some implementations, terminating device 205 may provide location information to ePDG 245 when (or after) terminating device 205 causes the tunnel to be created. Location information may include information associated with a geographical location of terminating device 205. For example, the location information may include information that identifies terminating device 205 (e.g., a device name, an international mobile subscriber identity (IMSI), an international mobile equipment identity (IMEI), an IP address, etc.), information that identifies WLAN 255 and/or AP device 250 (e.g., a media access control (MAC) address associated with AP device 250, a service set identifier (SSID) associated with WLAN 255), information that identifies a cell, included in the LTE network, associated with terminating device 205 (e.g., a cell global identity (CGI), an enhanced CGI (ECGI), etc.) and/or another type of information.

As further shown in FIG. 4, process 400 may include providing location information associated with the terminating device (shown at reference number 410). For example, ePDG 245 may provide the location information associated with terminating device 205. In some implementations, ePDG 245 may provide the location information after terminating device 205 causes the tunnel to be created. Additionally, or alternatively, ePDG 245 may provide the location information after terminating device 205 provides the location information to ePDG 245.

In some implementations, ePDG 245 may provide the location information to HSS 230 included in the service provider network. Additionally, or alternatively, ePDG 245 may provide the location information to AAA 235 included in the service provider network.

As further shown in FIG. 4, process 400 may include storing the location information (shown at reference number 415). For example, HSS 230 may store the location information. In some implementations, HSS 230 may store the location after HSS 230 receives the location information from ePDG 245.

In some implementations, HSS 230 may store the location information in a memory location (e.g., a RAM, a ROM, a cache, a hard disk, etc.) of HSS 230. Additionally, or alternatively, HSS 230 may provide the location information to another device for storage.

In some implementations, HSS 230 may store information associated with the location information such that previous location information (e.g., location information provided by terminating device 205 when terminating device 205 connected to another WLAN 255 at an earlier time) are overwritten and/or deleted. Additionally, or alternatively, HSS 230 may store the location information such that HSS 230 may retrieve (e.g., based on information that identifies terminating device 205) the location information at a later time. In some implementations, HSS 230 may notify terminating device 205 and/or ePDG 245 that HSS 230 has received and stored the location information.

As further shown in FIG. 4, process 400 may include causing the tunnel, associated with the terminating device and the untrusted WLAN, to be removed (shown at reference number 420). For example, terminating device 205 may cause the tunnel, associated with terminating device 205 and WLAN 255, to be removed. In some implementations, terminating device 205 may cause the tunnel to be removed after HSS 230 stores the location information associated with terminating device 205. Additionally, or alternatively, terminating device 205 may cause the tunnel to be removed when terminating device 205 receives information, indicating that terminating device 205 is to remove the tunnel, from another device, such as HSS 230 and/or ePDG 245.

In some implementations, terminating device 205 may cause the tunnel to be removed based on receiving a notification associated with the location information. For example, HSS 230 may receive and store the location information, associated with terminating device 205, and may notify terminating device 205 that the location information has been stored, as discussed above. In this example, terminating device 205 may receive the notification (e.g., via ePDG 245), and may remove the tunnel based on receiving the notification.

In this way, ePDG 245 may not be required to maintain the tunnel when terminating device 205 is not receiving a call via WLAN 255. Rather, ePDG 245 may trigger a tunnel to be created as necessary (e.g., on-demand), as described below. In some implementations, operations 405 through 420 may be repeated each time terminating device 205 connects to a different WLAN 255 (e.g., via a different AP device 250). In this manner, HSS 230 may store up-to-date location information associated with terminating device 205.

As further shown in FIG. 4, process 400 may include receiving call setup information associated with a call to be received by the terminating device via the untrusted WLAN (shown at reference number 425). For example, PGW 225 may receive call setup information associated with a call to be received by terminating device 205 via WLAN 255. In some implementations, PGW 225 may receive the call setup information after an originating device (e.g., a device calling terminating device 205) places a call to terminating device 205. Additionally, or alternatively, PGW 225 may receive the call setup information when the call setup information is provided by another device, such as one or more devices included in the IMS core.

Call setup information may include information associated with connecting a call that is to be received by terminating device 205 via WLAN 255. For example, the call setup information may include information that identifies terminating device 205 (e.g., a device name, an IMSI, an IMEI, an IP address, etc.), information that identifies an originating device associated with the call (e.g., a device name, an IMSI, an IMEI, an IP address, etc.), information that identifies a type of service associated with the call (e.g., a voice call over WLAN service, a video call over WLAN service, etc.), and/or another type of information associated with connecting a call between terminating device 205 and the originating device.

As further shown in FIG. 4, process 400 may include determining location information associated with the terminating device (shown at reference number 430). For example, PGW 225 may determine location information associated with terminating device 205. In some implementations, PGW 225 may determine the location information after PGW 225 receives the call setup information. Additionally, or alternatively, PGW 225 may determine the location information after PGW 225 receives information, indicating that PGW 225 is to determine the location information, from another device, such as a device included in the IMS core.

In some implementations, PGW 225 may determine the location information based on sending a request for the location information. For example, PGW 225 may receive call setup information that includes information (e.g., an IMSI, an IMEI, an IP address, etc.) that identifies terminating device 205, and may send, to HSS 230, a request for location information associated with terminating device 205 identified in the call setup information. In this example, HSS 230 may receive the request, may determine (e.g., based on information stored by HSS 230 and the information that identifies terminating device 205) the location information associated with terminating device 205, and may provide the location information to PGW 225.

In some implementations, PGW 225 may attempt to cause terminating device 205 to create a tunnel, associated with receiving the call, via the LTE network (e.g., using an LTE paging procedure). For example, PGW 225 may receive the call setup information, and may determine location information that includes a cell identifier (e.g., an ECGI) associated with terminating device 205. In this example, PGW 225 may send, to terminating device 205 via the LTE network, an indication to terminating device 205 that terminating device 205 is to cause the tunnel to be created, and terminating device 205 may cause the tunnel to be created based on receiving the notification via the LTE network. In some implementations, PGW 225 may implement the LTE paging procedure before PGW 225 provides the call setup information and the location information to ePDG 245, as discussed below. Additionally, or alternatively, PGW 225 may implement the LTE paging procedure after PGW 225 provides the call setup information and the location information to ePDG 245 (e.g., when ePDG 245 is unable to cause the tunnel to be created by communicating with terminating device 205 via WLAN 255). Additionally, or alternatively, PGW 225 may not implement the LTE paging procedure (e.g., when the location information does not include a cell identifier, etc.).

As further shown in FIG. 4, process 400 may include providing the call setup information, associated with the call to be received by the terminating device, and the location information, associated with the terminating device, via the WLAN (shown at reference number 435). For example, PGW 225 may provide the call setup information, associated with the call to be received by terminating device 205, and the location information, associated with terminating device 205, via WLAN 255. In some implementations, PGW 225 may provide the call setup information and the location information after PGW 225 determines the location information.

In some implementations, PGW 225 may provide the call setup information and the location information to ePDG 245. In some implementations, the call setup information and the location information may be used (e.g., by ePDG 245) for the purpose of causing a tunnel to be created that allows terminating device 205 to receive the call via WLAN 255.

As further shown in FIG. 4, process 400 may include causing a tunnel, associated with the terminating device and the untrusted WLAN, to be created (shown at reference number 440). For example, ePDG 245 may cause a tunnel, associated with terminating device 205 and WLAN 255, to be created. In some implementations, ePDG 245 may cause the tunnel to be created when ePDG 245 receives the call setup information and the location information from PGW 225. Additionally, or alternatively, ePDG 245 may cause the tunnel to be created when ePDG 245 receives, from another device, information indicating that ePDG 245 is to cause the tunnel to be created.

In some implementations, ePDG 245 may cause the tunnel to be created by communicating with terminating device 205 in order to create the tunnel. For example, ePDG 245 may use the location information associated with terminating device 205 (e.g., an IMSI, an IMEI, a MAC address associated with AP device 250, an SSID associated with WLAN 255) to communicate with terminating device 205 in order to create the tunnel. In some implementations, ePDG 245 may cause an IPsec tunnel to be created between terminating device 205 and ePDG 245. Additionally, or alternatively, ePDG 245 may cause another type of tunnel to be created between terminating device 205 and ePDG 245.

In some implementations, ePDG 245 may be unable to cause the tunnel to be created. For example, if terminating device 205 is no longer connected to WLAN 255 and/or AP device 250 identified in the location information, then ePDG 245 may be unable to cause the tunnel to be created. If ePDG 245 is unable to cause the tunnel to be created, then, in some implementations, ePDG 245 may notify PGW 225 that ePDG 245 is unable to cause the tunnel to be created. In some implementations, PGW 225 may then attempt to reach terminating device 205 using the LTE paging procedure described above. Additionally, or alternatively, ePDG 245 may cause the call to be forwarded to a voice mail box associated with terminating device 205 and/or may cause the originating device to be notified that terminating device 205 is not available for the call.

As further shown in FIG. 4, process 400 may include causing the call to be received by the terminating device via the untrusted WLAN (shown at reference number 445). For example, ePDG 245 may cause the call to be received by terminating device 205 via WLAN 255. In some implementations, ePDG 245 may cause the call to be received after ePDG 245 causes the tunnel to be created.

In some implementations, ePDG 245 may cause the call to be received based on providing the call setup information to terminating device 205. For example, ePDG 245 may cause the tunnel to be created by communicating with terminating device 205 based on the location information, as described above, and ePDG 245 may provide the call setup information to terminating device 205. In this example, terminating device 205 may receive the call setup information, and the call may be received by terminating device 205 (e.g., the call between terminating device 205 and the originating device may be connected) via WLAN 255, ePDG 245, and/or the IMS core.

In some implementations, terminating device 205 may remove the tunnel after the call ends. For example, the call between terminating device 205 and the originating device may be connected via WLAN 255, and the call may end after a period of time. In this example, terminating device 205 may remove the tunnel such that ePDG 245 is not required to maintain the tunnel (e.g., since terminating device 205 is no longer receiving a call via WLAN 255). In some implementations, operations 425 through 445 may be repeated each time terminating device 205 is to receive a call via WLAN 255. In this way, ePDG 245 may be required to maintain a tunnel between terminating device 205 and ePDG 245 (e.g., via WLAN 255) only when terminating device 205 is receiving a call via WLAN 255.

Although FIG. 4 shows example operations of process 400, in some implementations, process 400 may include additional operations, fewer operations, different operations, or differently arranged operations than those depicted in FIG. 4. Additionally, or alternatively, two or more of the operations of process 400 may be performed in parallel.

Figure 5:
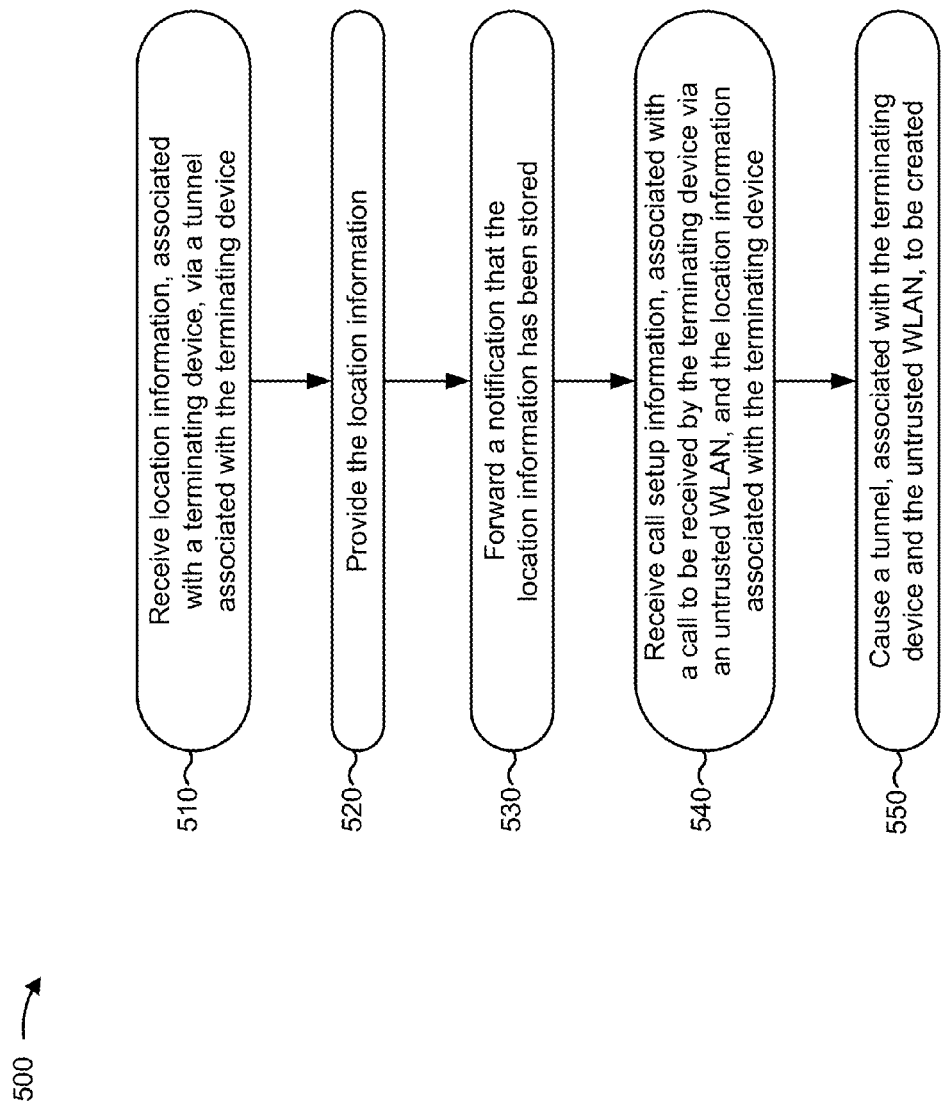
FIG. 5 is a flow chart of an example process for causing a tunnel, associated with a call to be received by a terminating device via a WLAN, to be created by communicating with the terminating device via the WLAN.

FIG. 5 is a flow chart of an example process 500 for causing a tunnel, associated with a call to be received by a terminating device via an untrusted WLAN, to be created by communicating with the terminating device via the untrusted WLAN. In some implementations, one or more process blocks of FIG. 5 may be performed by ePDG 245. Additionally, or alternatively, one or more process blocks of FIG. 5 may be performed by another device or a group of devices separate from or including ePDG 245, such as another device included in environment 200.

As shown in FIG. 5, process 500 may include receiving location information, associated with a terminating device, via a tunnel associated with the terminating device (block 510). For example, ePDG 245 may receive location information, associated with terminating device 205, via a tunnel associated with terminating device 205, as described above.

As further shown in FIG. 5, process 500 may include providing the location information (block 520). For example, ePDG 245 may provide the location information, associated with terminating device 205, to HSS 230 for storage, as described above.

As further shown in FIG. 5, process 500 may include forwarding a notification that the location information has been stored (block 530). For example, ePDG 245 may forward a notification (e.g., received from HSS 230) that the location information, associated with terminating device 205, has been stored by HSS 230. In some implementations, ePDG 245 may forward the notification to terminating device 205 to notify terminating device 205 to remove the tunnel, as described above.

As further shown in FIG. 5, process 500 may include receiving call setup information, associated with a call to be received by the terminating device via an untrusted WLAN, and the location information associated with the terminating device (block 540). For example, ePDG 245 may receive call setup information, associated with a call to be received by terminating device 205 via WLAN 255, and the location information, associated with terminating device 205, as described above.

As further shown in FIG. 5, process 500 may include causing a tunnel, associated with the terminating device and the untrusted WLAN, to be created (block 550). For example, ePDG 245 may cause a tunnel, associated with terminating device 205 and WLAN 255, to be created, as described above. In some implementations, ePDG 245 may cause the tunnel to be created to permit terminating device 205 to receive the call via WLAN 255, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
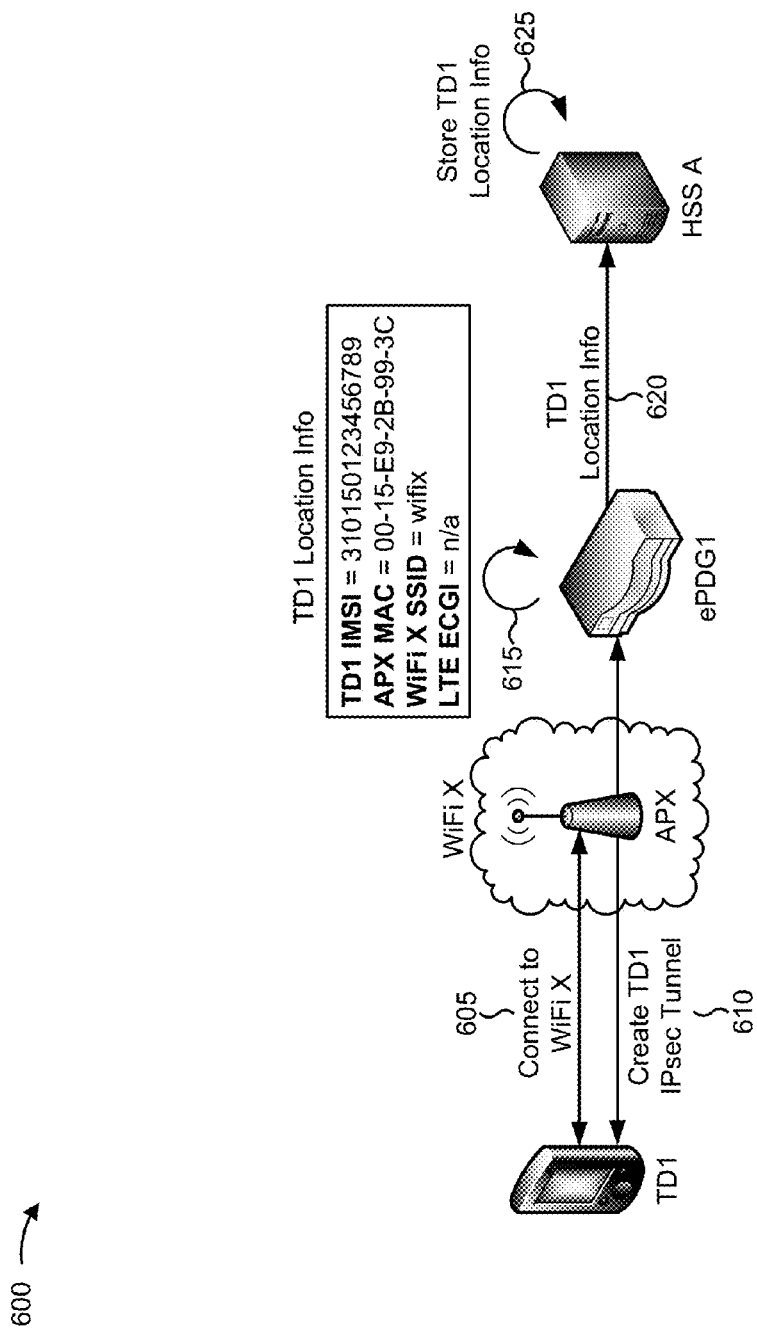
FIGS. 6A-6C are diagrams of an example implementation relating to the example processes shown in FIG. 4 and FIG. 5.
Figure 6B:
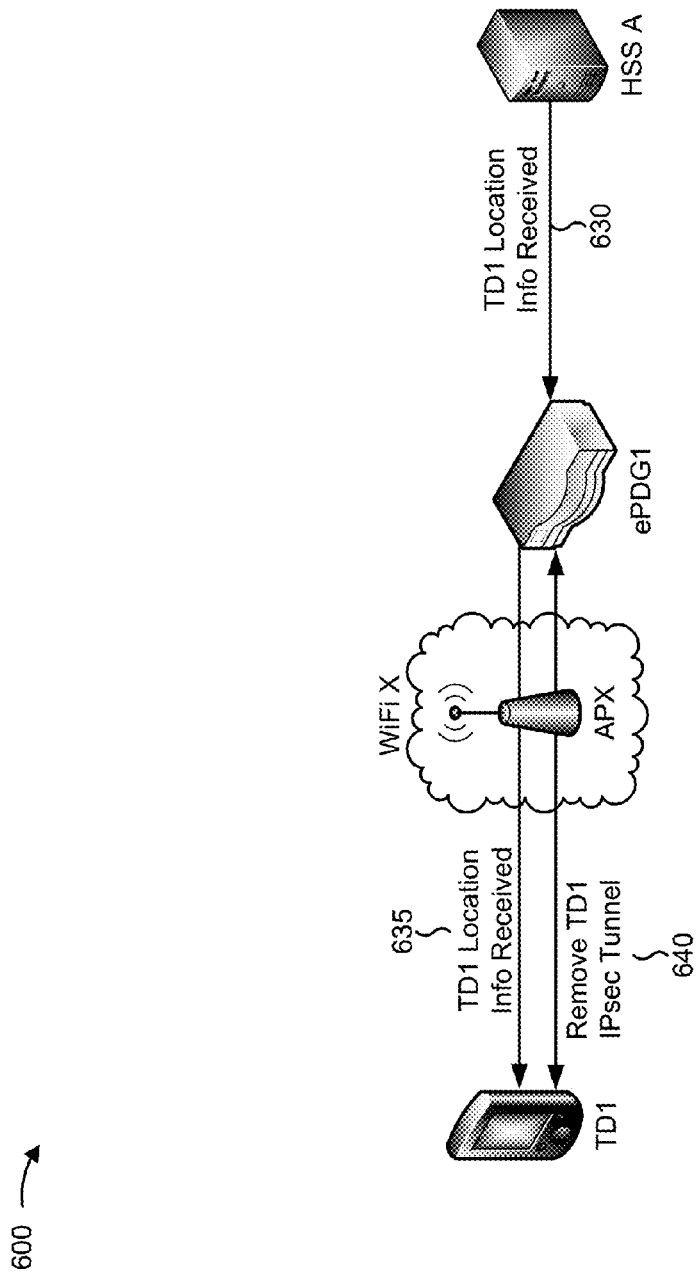
Figure 6C:
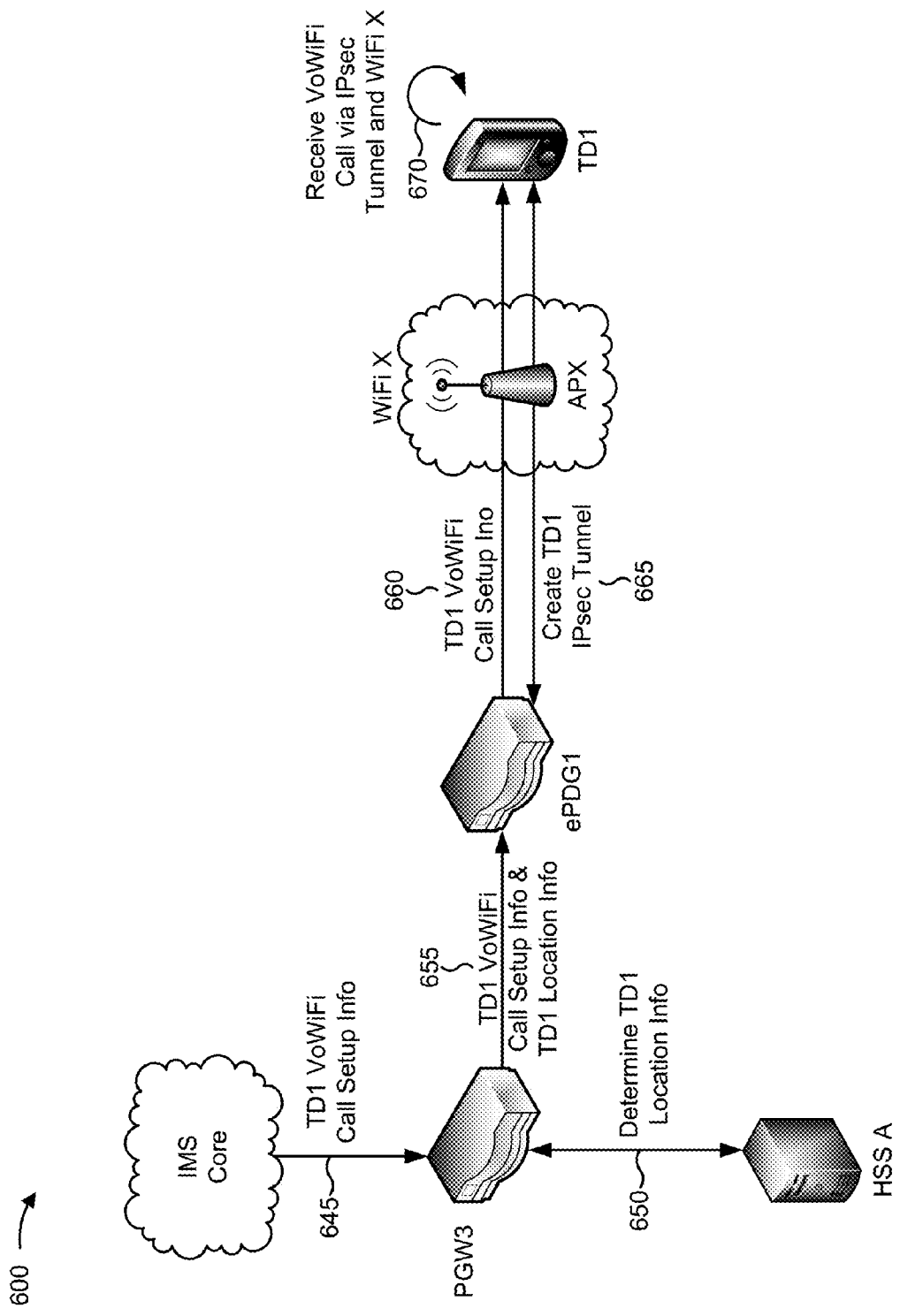

FIGS. 6A-6C are diagrams of an example implementation 600 relating to example processes 400 and 500 shown in FIG. 4 and FIG. 5, respectively. For the purposes of example implementation 600, assume that terminating device 205 (e.g., TD1) is configured to automatically create an IPsec tunnel between TD1 and ePDG 245 (e.g., ePDG1) when TD1 connects to WLAN 255 (e.g., WiFi X, an untrusted WLAN) via AP device 250 (e.g., APX). Further, assume that TD1 is not connected to an LTE network (e.g., assume that TD1 is not located in an LTE coverage area).

As shown in FIG. 6A, and by reference number 605, TD1 may connect to WiFi X (e.g., via APX). As shown by reference number 610, upon connecting to WiFi X, TD1 may communicate with ePDG1 to create an IPsec tunnel between TD1 and ePDG1 (e.g., via WiFi X). As shown by reference number 615, ePDG1 may determine (e.g., based on information received from TD1) TD1 location information associated with TD1. As shown, the location information may include information that identifies TD1 (e.g., TD1 IMSI=310150123456789), information that identifies APX (e.g., APX MAC=00-15-E9-2B-99-3C), information that identifies WiFi X (e.g., WiFi X SSID=wifix), and information indicating that TD1 is not attached to an LTE network associated with TD1 (e.g., LTE ECGI=n/a). As shown by reference number 620, ePDG1 may provide the TD1 location information to HSS 230 (e.g., HSS A). As shown by reference number 625, HSS A may store the TD1 location information.

As shown in FIG. 6B, and by reference number 630, HSS may notify ePDG1 that HSS A has received and stored the TD1 location information. As shown by reference number 635, ePDG1 may forward the notification to TD1 (e.g., via WiFi X). As shown by reference number 640, TD1 may receive the notification, and may communicate with ePDG1 to remove the TD1 IPsec tunnel (e.g., such that ePDG1 is no longer required to maintain the TD1 IPsec tunnel).

For the purposes of FIG. 6C, assume that TD1 is still connected to WiFi X at a later time (e.g., after TD1 has removed the TD1 IPsec tunnel). Further, assume that an originating device (not pictured) has placed (e.g., using a voice over WiFi (VoWiFi) service provided via the IMS core) a VoWiFi call to TD1. As shown by reference number 645, one or more devices included in the IMS core may provide TD1 VoWiFi call setup information to PGW 225 (e.g., PGW3) associated with the service provider network. As shown by reference number 650, PGW3 may receive the TD1 VoWiFi call setup information, and may determine (e.g., based on information identifying TD1 included in the TD1 VoWiFi call setup information and based on information stored by HSS A) the TD1 location information.

As shown by reference number 655, PGW3 may provide the TD1 VoWiFi call setup information and the TD1 location information to ePDG1. As shown by reference number 660, ePDG1 may then provide (e.g., based on the TD1 location information), the TD1 VoWiFi call setup information to TD1 (e.g., via WiFi X) in order to cause TD1 to create a TD1 IPsec tunnel. As shown by reference number 665, TD1 may receive the TD1 VoWiFi call setup information, and may create a TD1 IPsec tunnel between TD1 and ePDG1. As shown by reference number 670, the VoWiFi call from the originating device may be received by TD1 such that the VoWiFi call may be connected. TD1 may then remove the IPsec tunnel when the VoWiFi ends (e.g., such that ePDG1 is not required to maintain the IPsec tunnel).

As indicated above, FIGS. 6A-6C are provided merely as an example. Other examples are possible and may differ from what was described with regard to FIGS. 6A-6C.

Implementations described herein may allow a tunnel, associated with allowing a terminating device to receive a call via an untrusted WLAN, to be created in an on-demand manner by communicating with the terminating device via the untrusted WLAN (e.g., rather than via an LTE network).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    one or more devices to:

receive call setup information associated with a call to be received by a terminating device via a particular untrusted wireless local area network (WLAN);
determine location information, associated with the terminating device, based on the call setup information, the location information including information that identifies the particular untrusted WLAN to which the terminating device is connected;
determine that the terminating device is not connected to a long term evolution (LTE) network associated with the terminating device;
provide the call setup information to the terminating device via the particular untrusted WLAN based on determining that the terminating device is not connected to the LTE network,
the call setup information being provided to the terminating device based on the location information associated with the terminating device, and
the call setup information being provided to cause a tunnel to be created,
the tunnel, when created, allowing the terminating device to receive the call via the particular untrusted WLAN; and
cause the call to be received by the terminating device via the tunnel and the particular untrusted WLAN.

2. The system of claim 1, where the one or more devices are further to:
cause another tunnel, associated with the terminating device, to be created,
the other tunnel being created when the terminating device connects to the particular untrusted WLAN;
receive the location information based on causing the other tunnel to be created;
store the location information based on receiving the location information; and
where the one or more devices, when determining the location information associated with the terminating device, are further to:
determine the location information based on the stored location information.

3. The system of claim 2, where the one or more devices, when storing the location information, are further to:
provide a notification that the location information has been stored,
the notification being provided to cause the other tunnel, associated with the terminating device, to be removed.

4. The system of claim 1, where the location information includes information that identifies at least one of:
the terminating device;
an access point device associated with the particular untrusted WLAN;
the particular untrusted WLAN; or
an enhanced cell global identity associated with the terminating device.

5. The system of claim 1, where the one or more devices are further to:
determine that the call being received by the terminating device has ended; and
cause the tunnel to be removed based on determining that the call has ended.

6. The system of claim 1, where the tunnel is an internet protocol security tunnel.

7. A non-transitory computer-readable medium storing instructions, the instructions comprising:
one or more instructions that, when executed by one or more processors, cause the one or more processors to:
determine call setup information for a call to be received by a terminating device via a particular untrusted wireless local area network (WLAN);
determine location information based on the call setup information,
the location information being associated with the terminating device and including information that identifies a geographic location of the terminating device;
determine that the terminating device is not connected to a long term evolution (LTE) network associated with the terminating device;
send the call setup information to the terminating device via the particular untrusted WLAN based on the location information and based on determining that the terminating device is not connected to the LTE network,
the call setup information being provided to cause a tunnel to be created,
the tunnel, after being created, allowing the terminating device to receive the call via the particular untrusted WLAN; and
transmit the call to the terminating device via the tunnel and the particular untrusted WLAN.

8. The non-transitory computer-readable medium of claim 7, where the one or more instructions, when executed by the one or more processors, further cause the one or more processors to:
cause another tunnel, associated with the terminating device, to be created,
the other tunnel being created when the terminating device connects to the particular untrusted WLAN;
receive the location information via the other tunnel;
store the location information based on receiving the location information; and
where the one or more instructions, that cause the one or more processors to determine the location information associated with the terminating device, further cause the one or more processors to:
determine the location information based on the stored location information.

9. The non-transitory computer-readable medium of claim 8, where the one or more instructions, that cause the one or more processors to store the location information, further cause the one or more processors to:
provide a notification that the location information has been stored,
the notification being provided to cause the other tunnel, associated with the terminating device, to be removed.

10. The non-transitory computer-readable medium of claim 7, where the one or more instructions, when executed by the one or more processors, further cause the one or more processors to:
determine that the terminating device is to receive the call setup information via the particular untrusted WLAN rather than via the LTE network associated with the terminating device; and
where the one or more instructions, that cause the one or more processors to send the call setup information to the terminating device via the particular untrusted WLAN, further cause the one or more processors to:
send the call setup information to the terminating device via the particular untrusted WLAN based on determining that the terminating device is to receive the call setup information via the particular untrusted WLAN rather than via the LTE network.

11. The non-transitory computer-readable medium of claim 7, where the location information includes information that identifies at least one of:
the terminating device;
an access point device associated with the particular untrusted WLAN;
the particular untrusted WLAN; or
an enhanced cell global identity associated with the terminating device.

12. The non-transitory computer-readable medium of claim 7, where the one or more instructions, when executed by the one or more processors, further cause the one or more processors to:
determine that the call being received by the terminating device has ended; and
cause the tunnel to be removed based on determining that the call has ended.

13. The non-transitory computer-readable medium of claim 7, where the tunnel is an internet protocol security tunnel.

14. The non-transitory computer-readable medium of claim 7, where the one or more instructions, when executed by the one or more processors, further cause the one or more processors to:
determine that the call being received by the terminating device has ended; and
cause the tunnel to be removed based on determining that the call has ended.

15. A method, comprising:
receiving, by one or more devices, call setup information associated with a call to be received by a terminating device via a wireless local area network (WLAN);
identifying, by the one or more devices and based on receiving the call setup information, location information associated with the terminating device,
the location information including information that identifies a particular WLAN to which the terminating device is connected;
determining, by the one or more devices, that the terminating device is to receive the call setup information via the particular WLAN rather than via a long term evolution (LTE) network associated with the terminating device;
providing, by the one or more devices, the call setup information to the terminating device based on the location information and based on determining that the terminating device is to receive the call setup information via the particular WLAN rather than via the LTE network,
the call setup information being provided via the particular WLAN, and
the call setup information being provided to cause a tunnel to be created,
the tunnel allowing the terminating device to receive the call via the particular WLAN; and
causing, by the one or more devices, the call to be received via the tunnel and the particular WLAN.

16. The method of claim 15, further comprising:
causing another tunnel, associated with the terminating device, to be created,
the other tunnel being created when the terminating device connects to the particular WLAN;
receiving the location information based on causing the other tunnel to be created;
storing the location information based on receiving the location information; and
where identifying the location information associated with the terminating device comprises:
identifying the location information based on the stored location information.

17. The method of claim 16, where storing the location information comprises:
providing a notification that the location information has been stored,
the notification being provided to cause the other tunnel, associated with the terminating device, to be removed.

18. The method of claim 15, further comprising:
determining that the terminating device is not connected to the LTE network associated with the terminating device; and
where providing the call setup information to the terminating device via the particular WLAN further comprises:
providing the call setup information to the terminating device based on determining that the terminating device is not connected to the LTE network.

19. The method of claim 15, further comprising:
determining that the call being received by the terminating device has ended; and
causing the tunnel to be removed based on determining that the call has ended.

20. The method of claim 15, where the tunnel is an internet protocol security tunnel.

* * * * *